May 21, 1935.  C. D. GREENTREE ET AL  2,002,372
VIBRATION VELOCITY MEASURING DEVICE
Filed Aug. 23, 1933
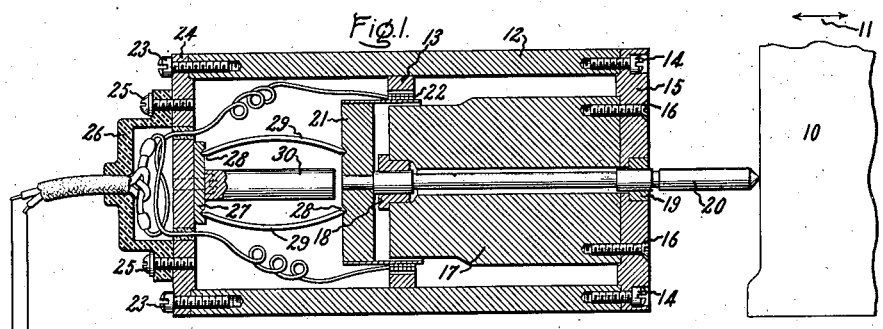
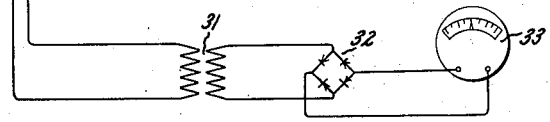
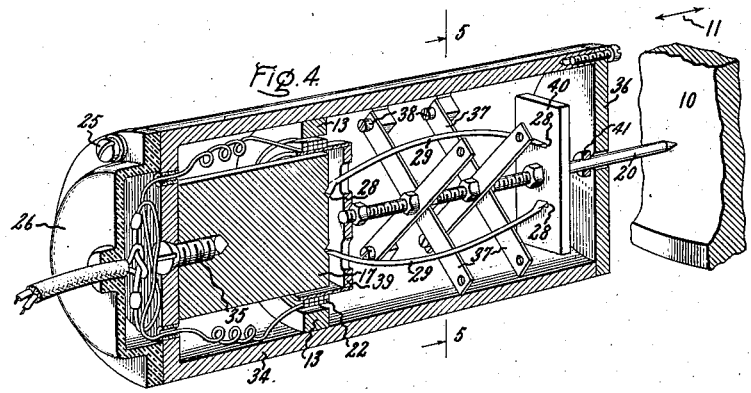
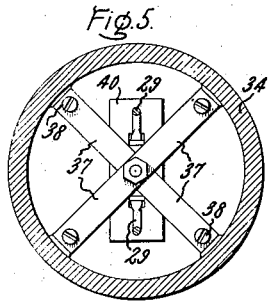
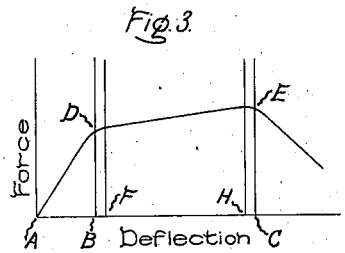
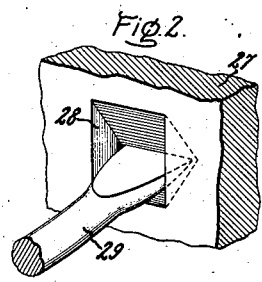
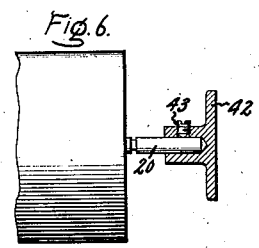
Inventors:
Charles D. Greentree,
Milton S. Mead, Jr.,
by Harry E. Dunham
Their Attorney.

Patented May 21, 1935

2,002,372

UNITED STATES PATENT OFFICE 2,002,372

VIBRATION VELOCITY MEASURING DEVICE

Charles D. Greentree and Milton S. Mead, Jr., Schenectady, N. Y., assignors to General Electric Company, a corporation of New York Application August 23, 1933, Serial No. 686,404

14 Claims. (Cl. 177—351)

Our invention relates to devices which are capable of converting vibration energy into another form of energy; e. g., electrical energy, and vice versa. The principal object of our invention is to provide an improved device of the above-mentioned character. A more specific object of our invention is to provide an improved device for measuring the vibration velocity of a vibrating body.

The steadily growing interest in the reduction of noise levels in machinery, factories, offices, and homes is causing engineers and scientists to make an intensive study of noise problems and noise suppression. The amplitude at which a given object vibrates depends largely upon its physical characteristics, whereas the frequency of its vibration depends largely upon its physical characteristics and upon the fundamental frequency of the vibration source; and, therefore, the determination of the amplitude and frequency is usually of interest only to the designer. The velocity at which an object vibrates, however, is of prime interest in a consideration of noise measurement or noise suppression. The reason for this is that the noise produced by a vibrating object is a measure of the energy it expends, and the vibration energy it expends is more often proportional to the velocity of vibration than it is either to amplitude or frequency of vibration, because the vibration energy is substantially directly proportional to the square of the velocity. It, therefore, became desirable to provide a device which is capable of measuring the velocity at which a body vibrates in the audible frequency range.

Our invention provides a device of this character. Briefly described, a preferred form of our device consists of a movable magnetic field structure adapted to be gripped by the hand of an operator and arranged to provide an air gap as a part of its magnetic circuit, a movable rod having one end thereof adapted to make contact with the vibrating body whose vibration velocity is to be measured and having secured to its other end a coil disposed in the magnetic air gap, and spring means interposed between the magnetic field structure and rod to produce an elastic restoring force therebetween and for restricting the rod to a degree of freedom that causes the coil to cut the magnetic flux passing across the air gap in response to relative motion between the rod and the magnetic field structure. The mass and stiffness of the rod and parts secured thereto are so selected that this structure has a narrow resonance range and so that its natural frequency of vibration is considerably above the lowest frequency of vibration of the vibrating body and preferably is appreciably above the highest frequency of vibration of the vibrating body, whereas the mass of the magnetic field structure and the stiffness of the springs are so selected that the natural frequency of vibration of the field structure with respect to the above-mentioned rod is appreciably below the lowest frequency of vibration of the vibrating body. The structure comprising the rod and the parts secured thereto, therefore, vibrate in substantial synchronism with the vibrating body, whereas the magnetic field structure remains almost stationary over the entire frequency range at which the vibrating body vibrates, hence the relative motion between the coil and magnetic field structure is substantially directly proportional to the vibration velocity of the vibrating body. It, therefore, follows that the voltage induced in the coil will be substantially directly proportional to the vibration velocity of the vibrating body. The voltage induced in the coil, or a voltage substantially directly proportional thereto, is impressed on a suitably calibrated instrument which indicates the vibration velocity of the vibrating body.

Although, when any of the commonly used forms of springs is interposed between the rod and the magnetic field structure in the above-described vibration velocity measuring device, the latter can be readily built to measure with a high degree of accuracy, the vibration velocity of a body when the latter vibrates at or near the highest frequency of the audible frequency range, or even above this highest frequency, and to measure with a fair degree of accuracy the vibration velocity of a body when the latter is vibrating only slightly above the lowest frequency of the audible frequency range, it becomes increasingly difficult with a given magnetic field structure, when using such springs, to obtain the desired measuring accuracy from this device as the frequency of vibration of the vibrating body decreases and closely approaches the lowest frequency of the audible frequency range. The reason for this is that in order to obtain the desired measuring accuracy at or near the lowest frequency of the audible frequency range it is necessary to have the natural frequency of vibration of the magnetic field structure appreciably below this lowest frequency in order that this structure will remain practically stationary while the rod is vibrating substantially in synchronism with the vibrating body. This, however, makes it necessary to employ a spring or springs between the rod and magnetic field structure having a relatively low dynamic force, i. e., a spring requiring a comparatively small change in force to produce a comparatively large change in deflection thereof, in other words, a spring having a comparatively small stiffness. On the other hand, mechanical considerations of construction require that this spring also have a comparatively high static force, i. e., have a comparatively high total force. In order to satisfy both of these requirements it is necessary, when employing any of the commonly used forms of springs, to use a comparatively long spring. This, however, is a serious disadvantage to the practical success of a device of this character because it increases the size and cost thereof and makes it difficult, if not impossible, to build the device as a portable measuring device which can be readily gripped by the hand of an operator.

Our invention, however, overcomes this disadvantage by interposing between the rod and magnetic field structure one or more comparatively short springs each of which has such peculiar force deflection characteristics that over a critical operating range thereof it has a comparatively high static force but a comparatively low dynamic force, in other words, it has during this critical operating range the characteristics of a comparatively long commonly used form of spring. We also provide means for limiting the relative motion between the rod and magnetic field structure to confine the operation of each of these springs to its above described critical operating range. We are thus enabled to employ one or more comparatively short springs and yet obtain a device which operates as if it had one or more comparatively long commonly used form of springs. This additional and highly important feature of our invention, therefore, makes it possible to provide a device having a high measuring accuracy not only in the frequency range but also above and below this range, and at the same time the device can be made comparatively small so as to be readily portable and be easily gripped by the hand of an operator.

Our invention, however, will be best understood from the following description when considered in connection with the accompanying drawing while those features of our invention which are believed to be novel and patentable are pointed out in the appended claims.

Fig. 1 of the drawing represents a sectional view of a preferred form of our device employing only two comparatively short springs each having the peculiar force deflection characteristics previously mentioned. This figure also diagrammatically represents the coil of our device connected to an output measuring circuit. Fig. 2 represents an enlarged perspective view showing how each end of the springs shown in Fig. 1 fits in its bearing. Fig. 3 shows a curve representing the general force deflection characteristics of each spring shown in Fig. 1. Fig. 4 represents another embodiment of my invention employing two springs as shown in Fig. 1 in combination with four springs of the commonly used type. Fig. 5 represents a sectional end view taken on the line 5—5 in Fig. 4. Fig. 6 represents a side view of a portion of our device showing the contact rod having a flanged plate secured thereto for making contact with the vibrating body whose vibration velocity is to be measured. Similar parts in the various figures are represented by similar reference characters.

Either form of our invention can measure the vibration velocity of a vibrating body, and can measure this velocity in any one plane at a time. For the sake of illustration we have represented in Fig. 1 a portion of a vibrating body by reference numeral 10, this body portion vibrating in the plane represented by the double headed arrow 11. The device shown in Fig. 1 for measuring the vibration velocity of body 10 consists of a cylindrical casing 12 of magnetic material and of suitable external diameter to be readily gripped by the hand of an operator and having secured to its internal periphery by any suitable means (not shown) an annular ring 13 of magnetic material. Secured to the right-hand end of casing 12 by screws 14 is a cover 15 of magnetic material and secured to this cover by screws 16, is a magnet 17, preferably a permanent magnet. Magnet 17 is cylindrically shaped, its free end has an external diameter slightly smaller than the internal diameter of ring 13, and the length and arrangement of the magnet are such that there is an annular air gap between the free end of the magnet and ring 13, hence a magnetic flux passes across this air gap. Pressed into the free end of magnet 17 and into plate 15, respectively, are two suitable antifriction self-lubricating bearings 18 and 19 respectively, and slidably mounted in these bearings is a light-weight metallic contact rod 20 for receiving or delivering the vibration energy, depending on how our device is to be used. A portion of this rod extends away from plate 15 and has its free end adapted to make contact with some part of vibrating body 10, as shown, and to the other end of this rod is secured a metallic coil holder 21 to which is secured a coil 22 disposed in the annular air gap between the free end of magnet 17 and ring 13.

Secured to the left-hand end of casing 12 by screws 23 is a plate 24 of magnetic material and secured to this plate by screws 25 is a cup-shaped cover 26. To the inside face of plate 24 is secured a plate 27 having two V-shaped notches 28 which are more clearly illustrated in Fig. 2. Two similar notches are provided in coil holder 21. These notches are substantially the same distance from the axis of rod 20 and are so positioned that one of the notches on plate 27 is substantially directly opposite one of the notches on coil holder 21 and the other notch on plate 27 is substantially directly opposite the other notch on coil holder 21. Two comparatively short steel column springs 29 having V-shaped ends are interposed between coil holder 21 and plate 27 to produce an elastic restoring force therebetween, the ends of one spring fitting into two of the substantially opposite notches 28, and the ends of the other spring fitting into the other two substantially opposite notches 28. Fig. 2 clearly shows how one of the V-shaped ends of a spring 29 fits into one of the notches 28, and from this figure it is clear that the notch is sufficiently large to permit considerable change in deflection of the spring without the latter striking either side of the notch.

Each spring 29 has the peculiar force-deflection characteristic represented by the curve shown in Fig. 3. Thus, each spring has a substantially uniform stiffness from its free state represented by A until it has been deflected a critical amount as represented for example by B. By the spring stiffness we mean the number of pounds force required to change the deflection of the spring a unit amount. As soon as the spring is deflected above its critical deflection value, its stiffness almost abruptly decreases to a considerably lower value and practically remains at this lower value with further deflections thereof until its elastic limit is reached, as shown for example by C. The great difference between the stiffness of the spring before and after it has been deflected to its critical deflection value may be readily seen from the great difference between the slopes of the lines AD and DE. It is, therefore, clear that each spring has a critical operating range between its critical deflection value and its elastic limit during which it has a relatively high static force but a relatively low dynamic force, in other words each spring has a critical operating range during which it has a relatively high total force and at the same time it has a comparatively small stiffness, hence the spring has during its critical operating range the characteristics of a comparatively long commonly used type of spring. We confine the deflections of each spring during the operation of our device between its critical deflection value and its elastic limit in order to take advantage of the unique characteristics of the spring, and we are thus enabled to employ two springs which are comparatively short but which, nevertheless, have the stiffness characteristics of two comparatively long commonly used type of springs.

The marked change in slope of the force-deflection diagram from that in the initial portion of the curve near the origin A to that in the operating portion of the curve between D and E results, we believe, from the fact that, at first, the spring acts substantially as an undeflected column subject to compressive force only as in a short block or pier. With the application of greater force, however, as the spring deflects appreciably to the side or laterally, bending stresses come into play and the force per unit area in the outer fibers of the spring may be much greater than the quotient of the total force acting and the cross-sectional area of the spring. Increased deflection increases the eccentricity of the loading so that the moment arm of the external force increases nearly as rapidly as the resisting moment in any section of the spring. Consequently, in the operating portion of the force-deflection diagram, relatively large variations in deflection correspond to very slight variations in external force. The portion of the force-deflection diagram, Fig. 3, beyond E, in which force decreases with deflection corresponds to bending the spring beyond its elastic limit, after which the usual relationship between unit-stress and deformation of elastic material no longer holds, as is well known in the art.

We confine the deflection of each spring to its critical operating range by securing to plate 27 in Fig. 1 a rod 30 of such length and by making bearing 18 of such length that when coil holder 21 rests against the bearing each spring is deflected an amount represented by F in Fig. 3, for example, and when the coil holder rests against the free end of the rod 30 each spring is deflected an amount represented by H in Fig. 3, for example. The ends of coil 22 are connected by means of leads passing through holes in plate 24 and cover 26 to the primary winding of a transformer 31 whose secondary winding is connected in series with a full wave rectifier 32 to an electrical indicating instrument 33 whose scale is preferably calibrated in vibration velocity mils per second.

Rod 20, coil holder 21 and coil 22 are so proportioned and dimensioned that the mass of this structure and the stiffness of the rod (it being remembered that the rod is somewhat elastic) are such that the natural frequency of vibration of this structure is considerably above the lowest frequency of the audible frequency range and so that this structure has a very narrow resonance band in the vicinity of its natural frequency of vibration. This is accomplished, as will be well understood by those skilled in the art, by making the whole assembly very rigid, that is, stiff along the axis of motion so that the resonance band will not only be narrow but will also be small in amplitude. Moreover, whenever it is practical to do so, the natural frequency of vibration of the structure comprising rod 20, coil holder 21 and coil 22 is made appreciably above the highest frequency of the audible frequency range or at least above the highest frequency at which body 10 vibrates. The mass of casing 12, magnet 17 and all other parts secured to the casing and the stiffness of each spring 29 during its critical operating range are such that the natural frequency of vibration of the casing and magnet is appreciably below the lowest frequency of the audible range. By employing column springs 29 in the manner described it is readily possible to make the natural frequency of vibration of casing 12 and magnet 17 as low as 2 or 3 cycles per second, whereas such a low natural frequency would be extremely difficult, if not impossible, to obtain if any of the commonly used forms of springs were used in place of springs 29.

Asssume, for example, that the audible frequency range extends from 20 to 15,000 cycles per second and that body 10 may vibrate at any frequency from 20 to 3000 cycles per second. When an operator desires to measure the vibration velocity of body 10 he grips casing 12 in his hand and presses the free end of contact rod 20 against the vibrating body with sufficient force to move coil holder 21 away from bearing 18 so the coil holder will be practically central between this bearing and the end of rod 30. Assuming that the amplitude of vibration of body 10 is not sufficient to cause the coil holder to strike either bearing 18 or the adjacent end of rod 30, the contact rod 20 will have oscillatory translational motion in substantial synchronism with body 10 because springs 29 will keep the contact rod against the vibrating body 10. Furthermore, since the structure comprising rod 20, coil holder 21 and coil 22 has a natural frequency of vibration which is appreciably above the highest frequency at which body 10 vibrates and has a very narrow resonance band in the vicinity of its natural frequency of vibration, this structure will vibrate at substantially the same velocity as body 10 throughout the range of frequencies at which the latter vibrates. Casing 12 and magnet 17, however, will remain practically stationary during the entire vibration frequency range of body 10 because the natural frequency of vibration of the casing and magnet is appreciably below the lowest frequency of vibration of body 10. Consequently, the velocity of the relative motion between casing 12 and rod 20 will be substantially equal to the vibration velocity of body 10 during the entire vibration frequency range of the latter, hence during this frequency range coil 22 will cut the magnetic flux passing across the annular air gap at a rate which is substantially directly proportional to the vibration velocity of body 10 as the coil oscillates a comparatively small amount in a concentrated magnetic field. It, therefore, follows that the voltage induced in coil 22 will be substantially directly proportional to the vibration velocity of body 10 throughout the vibration frequency range of the latter, and by suitably calibrating instrument 33 the latter will correctly indicate the vibration velocity of body 10 in mils per second.

It is obvious that our device will also accurately measure the vibration velocity of body 10 when the latter is vibrating below the lowest frequency of the audible frequency range, providing, however, that the body is vibrating appreciably above the natural frequency of 2 or 3 cycles per second of casing 12 and magnet 17. Also, assume that body 10 may vibrate above 3000 cycles per second and up to the highest frequency of the audible frequency range and even higher, and further assume that it is desired to measure the vibration velocity of this body. Our device will then even under the most unfavorable conditions accurately measure the vibration velocity of body 10 except during a very narrow range of frequencies. Thus, assume for example that the structure comprising rod 20, coil holder 21 and coil 22 has a natural frequency of 5000 cycles per second. However, since this structure has a very narrow resonance band in the vicinity of its natural frequency of vibration, it will vibrate at a velocity which is substantially equal to the vibration velocity of body 10 except when the latter is vibrating at 5000 cycles per second and during a few cycles on either side of 5000 cycles per second. In view of this fact and the further fact that casing 12 and magnet 17 will remain practically stationary during the entire vibration frequency range of body 10, it follows that our device will accurately measure the vibration velocity of body 10 except during a very narrow frequency range of its vibration. It should be clear, therefore, that our device is not only capable of measuring with a high degree of accuracy the vibration velocity of a body vibrating in the audible frequency range, but will also do this both above and below the audible frequency range.

The total impedance of coil 22 and transformer 31 is approximately matched against the total impedance of the output circuit consisting of rectifier 32 and instrument 33. This makes available the maximum electrical output from our device for operating an electrical instrument, hence making it possible to reduce our device to the smallest possible size that will produce the desired result.

The device illustrated in Fig. 4 consists of a cup-shaped cylindrical casing 34 of magnetic material and of suitable external diameter to be readily gripped by the hand of an operator and having secured to its internal periphery an annular ring 13 of magnetic material. Secured to the inside bottom face of casing 34 by means of a screw 35 is a magnet 17, preferably a permanent magnet. This magnet is of such shape and dimensions that there is an annular air gap between the free end of the magnet and ring 13, hence a magnetic flux passes across this air gap. Secured across the otherwise open end of casing 34 is a plate 36 of magnetic material having a clearance hole through which protrudes a portion of contact rod 20. Interposed between rod 20 and casing 34 are two sets of spaced apart commonly used forms of flat steel springs 37. Each set consists of two springs secured at approximately their center to rod 20 so that they are substantially perpendicular to each other and having their free ends secured to bosses on the internal periphery of casing 34 by screws 38. This arrangement of springs 37 will be easily understood from Figs. 4 and 5. A coil holder 39 is secured to the end of rod 20 adjacent magnet 17, and secured to this coil holder is the coil 22 disposed in the annular air gap between magnet 17 and ring 13. It is clear that although there are no guide bearings in which rod 20 can slide, the arrangement of springs 37 as shown will restrict the rod to a single degree of freedom that will cause coil 22 to cut the magnetic flux passing across the annular air gap when there is relative motion between the rod and casing. Secured to rod 20 is a plate 40 having two V-shaped notches 28 which are respectively directly opposite two similar notches in the opposite face of magnet 17. Two comparatively short column springs 29 have V-shaped ends fitting into these notches 28 as shown, these springs passing through two holes in coil holder 39. The end of each spring 29 fits into a V-shaped notch 28 as shown in Fig. 2. A collar 41 is secured to rod 20 a short distance away from the inside face of plate 36, the outside diameter of this collar being larger than the diameter of the adjacent hole in the plate.

We will first describe the operation of the device shown in Fig. 4 when column springs 29 are omitted therefrom and then describe the advantage of employing these springs in addition to springs 37. Assume that column springs 29 are omitted from the device shown in Fig. 4. The operation of the device will then be similar to that of the device shown in Fig. 1 except that the natural frequency of vibration of its magnet and casing will be appreciably higher than that of the magnet and casing of the device shown in Fig. 1. The reason for this is that each comparatively short commonly used type of springs 37 necessarily has a much higher stiffness than that which can be obtained from each column spring 29 in Fig. 1 when the latter is operated over its critical operating range as previously described. Consequently, with column springs 29 omitted the casing and magnet of the device shown in Fig. 4 will not remain practically stationary to as low a frequency of vibration of body 10 as will the casing and magnet of the device shown in Fig. 1, and, therefore, will not accurately measure the vibration velocity of body 10 to as low a frequency of vibration as will the device shown in Fig. 1. In many cases this is not a disadvantage because it is frequently desired to measure the vibration velocity of a body vibrating through a range of frequencies the lowest of which is appreciably above the natural frequency of vibration of the casing and magnet of the device shown in Fig. 4 when its column springs 29 are omitted. It is, therefore, clear that the device shown in Fig. 4 with its column springs 29 omitted will have an important field of practical use.

When, however, it is desired to employ the device shown in Fig. 4 and to measure accurately therewith the vibration velocity of a vibrating body down to a frequency which is lower than that which can be accurately measured by the device with its column springs 29 omitted, then this may be accomplished by also employing its column springs and confining the deflection of each column spring during the operation of the device to its critical operating range. This is obtained by having the end of rod 20 inside of casing 34 the proper distance from the adjacent face of magnet 17 and having collar 41 the proper distance from the face of plate 36 so that when the collar rests against the plate each column spring 29 is deflected to the value F in Fig. 3 and when the end of rod 20 rests against the magnet each column spring 29 is deflected to the value H in Fig. 3. The resultant stiffness of the combination of springs 37 and that of each column spring 29 during its critical operating range will cause the casing and magnet of the device shown in Fig. 4 to have an appreciably lower natural frequency of vibration than it would have with column springs 29 omitted but it will still be appreciably higher than that of the casing and magnet of the device shown in Fig. 1, assuming of course that the mass of the casing and magnet and the parts secured to the casing is the same in Figs. 1 and 4. It is, therefore, evident that the device shown in Fig. 4 has the advantage of being capable of accurately measuring the vibration velocity of a vibrating body down to a frequency which is not very much higher than the minimum frequency at which the device shown in Fig. 1 can give accurate measurements and at the same time the device shown in Fig. 4 has the additional advantage of not requiring sliding bearings for its rod 20. Of course, there is practically no difference between the inherent accurate measuring abilities of the three devices described so far as the upper limit of frequency vibration is concerned.

In Figs. 1 and 4 it is seen that the portion of the casing which extends from ring 13 away from magnet 17 serves as a magnetic shield, thus eliminating possible errors in measurements due to any external stray flux in the vicinity of the device.

A very useful field of application for either form of our device will be as a "Go" or "No Go" measuring device. This field of application may be illustrated by assuming a production line of electric or internal combustion motors going through test, and assuming that an acceptable motor, in so far as the noise produced thereby, has been measured for its vibration velocity in many different planes and that the maximum indication of instrument 33 during this test was 5, for example. The motors in the production line are then tested one after another for vibration velocity in different planes. This can be readily accomplished since instrument 33, rectifier 32 and transformer 31 are so small that they can be held in one hand, especially when they are assembled as a unit, and the tester grasps the casing of the device in the other hand, and since the entire device is light, portable, and needs no outside source of power for its operation, the tester can rapidly test each motor in many different planes. When a motor vibration produces a reading of 5 or under on instrument 33, the tester knows that this motor is satisfactory for production use, whereas when a motor vibration produces a reading of more than 5 on the instrument, the tester knows that the motor is unsatisfactory for noise and he returns it to the assembly room for correction.

It is oftentimes necessary to measure the vibration velocity of a vibrating body whose physical nature is such that it is undesirable to press thereagainst the small free end of the contact rod, or whose expenditure of vibration energy per unit of area is so small that an insufficient amount of this energy will be transmitted to the rod to obtain satisfactory operation of the measuring device. An example of this is when it is desired to use either form of our device in a manner somewhat similar to that for which a stethoscope is used, except that instead of listening for sounds produced in the patient's chest, abdomen, etc., it is desired to measure the velocity of the vibrations which produce these sounds. The aforementioned difficulties may be overcome and satisfactory operation of the device obtained when used with vibrating bodies of this character by securing, as shown in Fig. 6, a flanged member 42 to rod 20 by a screw 43, the contact area of the flanged member being considerably greater than the area of the rod end.

In accordance with the provisions of the patent statutes, we have described the principles of operation of our invention, together with the apparatus which we now consider to represent the best embodiments thereof, but we desire to have it understood that the apparatus shown and described is only illustrative and that the invention may be carried out by other means.

What we claim as new and desire to secure by Letters Patent of the United States is:

1. In a device for converting vibration energy into another form of energy and vice versa, the combination of a movable structure arranged to receive or deliver said vibration energy, another structure, means operatively associated with said structures for effecting said energy conversion in response to relative motion between said structures, resilient means interposed between said structures for producing an elastic restoring force therebetween, said resilient means having a critical operating range during which its force deflection characteristic differs radically from the force deflection characteristics it has outside this critical operating range, and means for limiting the relative motion of said structures to confine the operation of said resilient means to its critical operating range, the relationship between the mass of the second-mentioned structure and the stiffness of said resilient means during its critical operating range being such that the natural frequency of vibration of this structure is appreciably below the lowest frequency of said vibration energy, whereby only a negligible vibration force is transmitted by the first-mentioned structure to the second-mentioned structure during the frequency range of said vibration energy.

2. In a device for converting vibration energy into electrical energy and vice versa, the combination of a movable structure arranged to receive or deliver said vibration energy, another structure, one of said structures comprising a magnetic field system having an air gap as a part of its magnetic circuit and the other of said structures comprising a coil disposed in said air gap to cut the magnetic flux passing thereacross in response to a relative movement of said structures, resilient means interposed between said structures for producing an elastic restoring force therebetween, said resilient means having a critical operating range during which its force deflection characteristic differs radically from the force deflection characteristics it has outside this critical operating range, and means for limiting the relative motion of said structures to confine the operation of said resilient means to its critical operating range, the relationship between the mass of the second-mentioned structure and the stiffness of said resilient means during its critical operating range being such that the natural frequency of vibration of this structure is appreciably below the lowest frequency of said vibration energy, whereby only a negligible vibration force is transmitted by the first-mentioned structure to the second-mentioned structure during the frequency range of said vibration energy.

3. In a device for converting vibration energy into electrical energy and vice versa, the combination of a movable structure arranged to receive or deliver said vibration energy, another structure, one of said structures comprising a magnetic field system having an air gap as a part of its magnetic circuit and the other of said structures comprising a coil disposed in said air gap to cut the magnetic flux passing thereacross in response to a relative movement of said structures, spring means interposed between said structures for producing an elastic restoring force therebetween, said spring means having a critical deflection value at which its stiffness almost abruptly decreases from a given amount to a considerably lower amount for deflections thereof above this critical deflection value, and means for limiting the relative motion of said structures to confine the operation of said spring means to those deflections at which it has said considerably lower stiffness, the relationship between the mass of the second-mentioned structure and the stiffness of the spring means during its confined operating range being such that the natural frequency of vibration of the second-mentioned structure is appreciably below the lowest frequency of said vibration energy, whereby only a negligible vibration force is transmitted by the first-mentioned structure to the second-mentioned structure during the frequency range of said vibration energy.

4. In a device for converting vibration energy into another form of energy and vice versa, the combination of a movable structure arranged to receive or deliver said vibration energy, another structure, means operatively associated with said structures for effecting said energy conversion in response to relative motion between said structures, at least one column spring interposed between said structures for producing an elastic restoring force therebetween, said column spring having two critical deflection values between which its stiffness is considerably lower than that prevailing from its free state to the lower of its two critical deflection values, said spring stiffness changing almost abruptly at the lower of the two critical deflection values, and means for limiting the relative motion of said structures to confine the deflections of said spring between its critical deflection values, the relationship between the mass of the second-mentioned structure and the stiffness of said spring between its critical deflection values being such that the natural frequency of vibration of the second-mentioned structure is appreciably below the lowest frequency of said vibration energy, whereby only a negligible vibration force is transmitted by the first-mentioned structure to the second-mentioned structure during the frequency range of said vibration energy.

5. In a device for converting vibration energy into electrical energy and vice versa, the combination of a movable structure arranged to receive or deliver said vibration energy, another structure, one of said structures comprising a magnetic field system having an air gap as a part of its magnetic circuit and the other of said structures comprising a coil disposed in said air gap to cut the magnetic flux passing thereacross in response to a relative movement of said structures, at least one column spring interposed between said structures for producing an elastic restoring force therebetween, said column spring having two critical deflection values between which its stiffness is considerably lower than that prevailing from its free state to the lower of its two critical deflection values, said spring stiffness changing almost abruptly at the lower of the two critical deflection values, and means for limiting the relative motion of said structures to confine the deflections of said spring between its critical deflection values, the relationship between the mass of the second-mentioned structure and the stiffness of said spring between its critical deflection values being such that the natural frequency of vibration of the second-mentioned structure is appreciably below the lowest frequency of said vibration energy, whereby only a negligible vibration force is transmitted by the first-mentioned structure to the second-mentioned structure during the frequency range of said vibration energy.

6. In a device for converting vibration energy into electrical energy and vice versa, the combination of a movable structure arranged to receive or deliver said vibration energy, another structure, one of said structures comprising a magnetic field system having an air gap as a part of its magnetic circuit and the other of said structures comprising a coil disposed in said air gap, spring means interposed between said structures for producing an elastic restoring force therebetween and for restricting said movable structure to a degree of freedom that causes said coil to cut the magnetic flux passing across said air gap with relative movement of said structures, at least one column spring interposed between said structures for producing an additional elastic restoring force therebetween, said column spring having two critical deflection values between which its stiffness is considerably lower than that prevailing from its free state to the lower of its two critical deflection values, said spring stiffness changing almost abruptly at the lower of the two critical deflection values, and means for limiting the relative motion of said structures to confine the deflections of said column spring between its critical deflection values, the relationship between the mass of the second-mentioned structure, the stiffness of the first-mentioned spring means and the stiffness of said column spring between its critical deflection values being such that the natural frequency of vibration of this structure is appreciably below the lowest frequency of said vibration energy, whereby only a negligible vibration force is transmitted by the first-mentioned to the second-mentioned structure during the frequency range of said vibration energy.

7. A device for converting mechanical vibrations into an electric voltage comprising a movable structure adapted to be subjected to the vibrations to be investigated and to move in substantial synchronism with such vibrations, a second movable structure, means operatively associated with said structures for generating an electrical voltage in response to relative motion between the structures, at least one column spring interposed between said structures for producing an elastic restoring force therebetween, said column spring having two critical deflection values between which its stiffness is considerably lower than that prevailing from its free state to the lower of its two critical deflection values, said spring stiffness changing almost abruptly at the lower of the two critical deflection values, and means for limiting the relative motion of said structures to confine the deflections of said column spring between its critical deflection values, the relationship between the mass of the second-mentioned structure and the stiffness of said column spring between its critical deflection values being such that the natural frequency of vibration of this structure is appreciably below the lowest frequency of said vibration energy, whereby the second-mentioned structure remains almost stationary during the entire frequency range of said vibration energy.

8. A device for measuring the vibration velocity of a vibrating body, said device comprising a movable member having one end thereof adapted to make contact with the vibrating body, means for guiding said movable member so that the latter has oscillatory translational motion in substantial synchronism with that part of the vibrating body it is in contact with, a movable magnetic field structure having an air gap as a part of its magnetic circuit, a coil secured to said movable member and disposed in said air gap to cut the magnetic flux passing thereacross in response to relative motion between the movable member and the magnetic field structure, at least one column spring interposed between said movable member and said magnetic field structure for producing an elastic restoring force therebetween, said column spring having two critical deflection values between which its stiffness is considerably lower than that prevailing from its free state to the lower of its two critical deflection values, said spring stiffness changing almost abruptly at the lower of the two critical deflection values, and means for limiting the relative motion of said movable member and magnetic field structure to confine the deflections of said column spring between said critical deflection values, the relationship between the mass of the magnetic field structure and the stiffness of the column spring between its critical deflection values being such that the natural frequency of vibration of the magnetic field structure is appreciably below the lowest frequency of vibration of said vibrating body, whereby said magnetic field structure remains almost stationary during the entire frequency range at which said vibrating body vibrates.

9. A device for measuring the vibration velocity of a vibrating body, said device comprising a movable magnetic casing adapted to be gripped by the hand of an operator, a permanent magnet within said casing arranged to provide an annular air gap between the magnet and casing as a part of its magnetic circuit, a movable rod slidably mounted partly within said casing and having one end protruding therefrom adapted to make contact with the vibrating body, an annular coil secured to the other end of said rod, said coil being disposed in said air gap to cut the magnetic flux passing thereacross in response to relative motion between the magnet and coil, two column springs interposed between said casing and rod for producing an elastic restoring force therebetween, each column spring having a practically uniform stiffness from its free state until a critical deflection value thereof at which its stiffness almost abruptly decreases to a considerably lower value for deflections thereof till its elastic limit is reached, and means for limiting the relative motion between said rod and casing to confine the deflections of each column spring between its critical deflection value and its elastic limit, the relationship between the mass of said rod and the parts secured thereto and the stiffness of said rod being such that this structure has a natural frequency of vibration which is considerably above the lowest frequency of vibration of said vibrating body and has a very narrow resonance band in the vicinity of its natural frequency of vibration, whereas the relationship between the mass of the casing and magnet and the stiffness of each column spring between its critical deflection value and its elastic limit is such that the natural frequency of vibration of the casing and magnet is appreciably below the lowest frequency of said vibrating body, whereby said casing and magnet remain almost stationary during the entire frequency range at which said vibrating body vibrates.

10. A device for measuring the vibration velocity of a vibrating body, said device comprising a movable magnetic casing adapted to be gripped by the hand of an operator, a permanent magnet within said casing arranged to provide an annular air gap between the magnet and casing as a part of its magnetic circuit, a movable rod partly within said casing and having one end thereof protruding from the casing for making contact with the vibrating body, an annular coil secured to the other end of said rod, said coil being disposed in said air gap, and spring means interposed between said rod and said magnet for producing an elastic restoring force therebetween and for restricting said rod to a degree of freedom that causes said coil to cut the magnetic flux passing across said air gap with relative motion between the rod and magnet, the relationship between the mass of said rod and the parts secured thereto and the stiffness of said rod being such that this structure has a natural frequency of vibration which is considerably above the lowest frequency of vibration of said vibrating body and has a very narrow resonance band in the vicinity of its natural frequency of vibration, whereas the relationship between the mass of said casing and magnet and the stiffness of said spring means being such that the natural frequency of vibration of said casing and magnet is appreciably below the lowest frequency of vibration of said vibrating body, whereby said casing and magnet remain almost stationary during the entire frequency range at which said vibrating body vibrates.

11. In a device of the class described, the combination of two movable structures, at least one column spring interposed between said structures for producing an elastic restoring force therebetween, said column spring having two critical deflection values between which its stiffness is considerably lower than that prevailing from its free state to the lower of its two critical deflection values, said spring stiffness changing almost abruptly at the lower of the two critical deflection values, and means for limiting the relative motion of said structures to confine the deflections of said column spring between said critical deflection values, the relationship between the mass of one of said structures and the stiffness of said column spring between its critical deflection values being such that this structure remains almost stationary while the other structure is moving.

12. A device for measuring the vibration velocity in a vibrating body, said device comprising in combination a pair of relatively movable members, one of which is adapted to be placed in contact with said moving body, a column spring between said relatively movable members, means for restraining the relative motion of said relatively movable members to positions for any of which said column spring is deflected to the side and the resisting moment of sections of said spring varies relatively little with the moment arm of the external force acting thereon, and means for producing an electromotive force in response to relative motion between said members, the member adapted to be placed in contact with the moving body being relatively light and being relatively rigid in the direction of motion to give it a high natural period of vibration and permit it to follow accurately the vibrations of said vibrating body, and the other member having a relatively great mass in comparison with the first mentioned member whereby it cooperates with said column spring to have a relatively low natural frequency of vibration causing it to remain substantially stationary while the other member is in contact with a vibrating body.

13. In a device for measuring the vibration velocity of a vibrating body, the combination of a pair of relatively movable members, a column spring interposed between said movable members, and means for limiting the motion between said members to positions for any of which said column spring has its intermediate portion deflected to the side so that it is subject to bending stress as well as compressive stress and the variation in longitudinal force between the ends of said column spring with variation in longitudinal deflection thereof is relatively small in comparison with the variation in the longitudinal force with variation in longitudinal deflection of a laterally undeflected column spring.

14. A device for measuring the vibration velocity in a vibrating body, said device comprising in combination a pair of relatively movable members, one of which is adapted to be placed in contact with said moving body, a column spring between said relatively movable members, means for restraining the relative motion of said relatively movable members to positions for any of which said column spring is deflected to the side and the resisting moment of sections of said spring varies relatively little with the moment arm of the external force acting thereon, and measuring means responsive to the rate of relative motion between said relatively movable members.

CHARLES D. GREENTREE.
MILTON S. MEAD, JR.